Figure 1:
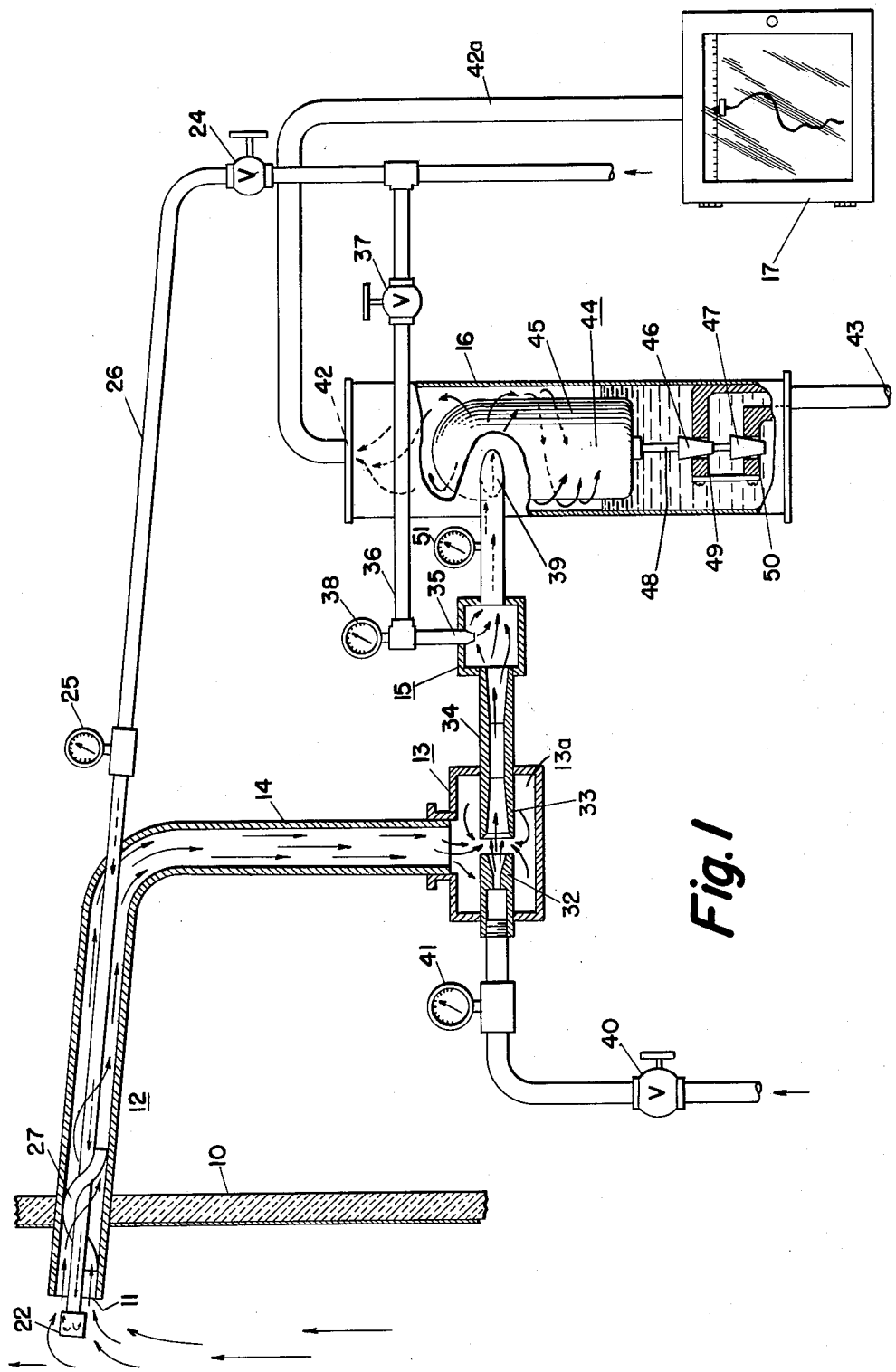

June 13, 1961　　　H. A. KRAFTSON　　　2,987,921
METHODS AND APPARATUS FOR SAMPLING GASES
Filed Jan. 12, 1956　　　　　　　　　　2 Sheets-Sheet 1

United States Patent Office 2,987,921
Patented June 13, 1961

2,987,921
METHODS AND APPARATUS FOR SAMPLING GASES
Harry A. Kraftson, Bala-Cynwyd, Pa., assignor to Leeds and Northrup Company, Philadelphia, Pa., a corporation of Pennsylvania
Filed Jan. 12, 1956, Ser. No. 558,714
6 Claims. (Cl. 73—421.5)

This invention relates to methods and apparatus for continuously withdrawing from a dust-ladened atmosphere a sample of gas for analysis and has for an object the maintenance of clean, washed sampling lines in avoidance of accumulation of solid particles within the sampling lines while avoiding the introduction of washing fluids into the dust-ladened gaseous atmosphere.

In the operation of furnaces such as those employed at power plants it is desirable to analyze the combustion or flue gases to determine the composition of the gases, particularly the oxygen or the carbon dioxide content thereof, in order that adjustments, either manual or automatic, may be made to operate the furnaces more efficiently. In carrying out the analysis, samples of the flue gas are aspirated from the flue by way of lines connected to the analyzer. It has been found, however, that where the flue gases are ladened with solid particles such as fly ash and the like the sampling equipment and lines become clogged by accumulation of the solid particles usually at a point in the sampling system where the temperature of the gaseous sample falls to its dew point. At such a location in the system the liquid formed by condensation within the sample gases mixes with the fly ash or other solid particles to form a mud which effectively blocks the lines of the sampling system and necessitates the shut-down of the sampling system in order that the clogged lines may be cleaned.

Accumulation of solid particles also may occur by successive impingement of dry solid particles upon internal surfaces of the sampling lines and upon each other.

Where the furnace is of the coal-burning type or any other type producing in the flue gases corrosive materials such as sulphur dioxide or corrosive salts acids or other corrosive liquids are formed when the temperature of the gas sample falls to its dew point. Such liquids may become concentrated to rapidly corrode the sampling lines, necessitating frequent replacement of equipment.

The clogging of the sampling lines has been materially reduced by employing within a portion of the sampling line extending into the flue, such portion being referred to as a probe, a flow of washing fluid, such as water, which is effective to prevent the accumulation of the solid particles by washing the particles through the sampling system to a point where they may be readily removed. In such systems the washing fluid is introduced at a point within the sampling probe and in such manner that a portion of the washing fluid is ejected or sprayed through the gas inlet of the sampling probe to maintain the inlet clean while the rest of the washing fluid is directed through the sampling probe in the direction of the gas sample to maintain the sampling lines clean. While such washing of probes has been effective in maintaining the probe and connected sampling lines free from accumulation of solid particles, the introduction of washing fluid such as water into the flue duct has introduced problems of operation and maintenance of the furnace itself. For example, the water issuing from the water-washed probe will, in many cases, fall upon furnace or process equipment. Furthermore, where the amount of wash water flowing in the direction of the gas sample is limited and where corrosive materials such as gases or soluble solids are present in the gaseous sample, this wash water absorbs the corrosive materials to form highly concentrated acids such as sulphurous acid which begin to corrode the sampling equipment. Accordingly, it is another object of the present invention to provide for substantial dilution of acids formed within the probe without introducing water or other washing fluids into the furnace or process.

In accordance with the present invention there is provided a fluid-washed probe in which the washing fluid is directed into the inlet of the probe and through the probe always in the direction of flow of the gaseous sample for maintaining the inlet and the internal surfaces of the probe free from accumulation of solid particles carried by the gaseous sample.

More particularly, there is provided in a sampling means including a sampling line for extending into a dust-ladened atmosphere and having an open end for the removal of a gas sample from the atmosphere, a nozzle having at least one opening for directing a stream of washing fluid into the open end of the sampling line from a point exterior thereto to prevent closure of the open end by accumulation of dust and other matter. The stream of wash fluid from the nozzle, in the region of the opening or inlet, encompasses an area less than that of the opening to insure that all the washing fluid from the nozzle enters the sampling means.

In a preferred embodiment of the invention the nozzle or spray head is provided with a plurality of openings all directed toward the open end of the sampling line or probe for producing in effect several streams of washing fluid. The streams of fluid define an area of lesser cross-section than the cross-section of the inlet of the sampling line for entry of all of the washing fluid from the nozzle into the inlet and through the sampling line to maintain the inlet open and to provide a fluid wash for the sampling line.

In accordance with another aspect of the present invention there is provided within the sampling probe and in the path of the gaseous sample and washing fluid a means for swirling the washing fluid and the gaseous sample to bring the washing fluid into contact with all the internal surfaces of the probe to maintain the surfaces free from accumulation of dust.

Figure 2:
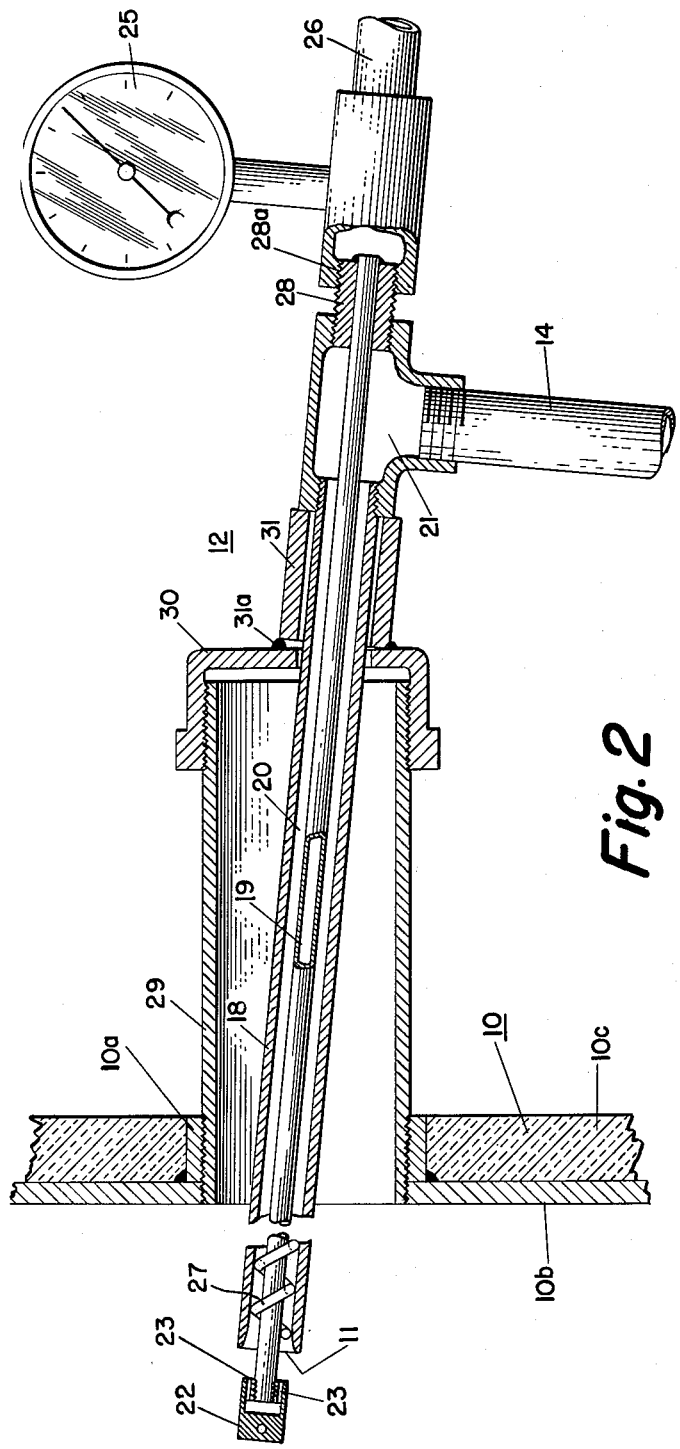

For other objects and advantages of the present invention reference may now be had to the following detailed description taken with the accompanying drawings in which:

FIG. 1 schematically illustrates in partial cross-section a gas analyzing system including the improved gas sampling probe; and FIG. 2 is an enlarged cross-section of a fluid-washed sampling probe embodying the present invention.

Referring now to FIG. 1, there is illustrated a flue duct 10 of a furnace, the gases of which are to be continuously sampled, cleaned and analyzed in order to determine the concentration of one or more components such as, for example, oxygen or carbon dioxide. Samples of the flue gas are continuously drawn into an inlet 11 of a sampling probe 12 by creation of a low pressure at the inlet through the operation of an aspirator 13 connected in the sampling line 14 at a point outside the gaseous atmosphere of the flue duct. The gaseous sample is cleaned by the operation of the aspirator 13, which is of the steam type, a water condenser 15, and a separator 16 and analyzed by an analyzer 17. The gas cleaning system described in detail hereinafter, is claimed in a copending joint application, Serial No. 558,731, filed by E. M. Yard and me on January 12, 1956, now United States Patent No. 2,895,335.

The sampling probe 12 is usually mounted on a wall of the duct 10 and extends into the flue duct at a point spaced above furnace equipment such as the air preheater. Where the furnace is of the coal-burning type, the gases passing through the flue are heavily ladened with solid particles, for example fly ash, and contain corrosive gases such as sulphur dioxide. This dusty corrosive mixture is drawn into and through the sampling probe 12 by the operation of the aspirator 13. In order to prevent the accumulation within the probe, sample lines, and the aspirator of the solid particles, the probe 12 is wahsed with a fluid, preferably water, which is introduced into the inlet of the probe and then preferably given a swirling motion during its initial passage through the probe. The path taken by the water is always in the direction of the gas sample, and its passage through the inlet 11 maintains the inlet free from accumulation of solid particles which would otherwise close the inlet. The internal wall structure of the probe 12 is maintained clean by the passage of the washing water therethrough; the water carrying the solid particles and corrosive materials from the probe to a point where they are later discharged from the system as at the separator 16.

By introducing the washing fluid from a point outside the probe there is avoided the introduction of washing fluid into the flue and onto furnace equipment while obtaining full benefit of the washing fluid to maintain the inlet 11 and the interior of the probe 12 free from accumulation of solid particles.

Because all the washing water is directed into the probe and through the sampling system the amount of water used may be determined solely by the cleaning requirements of the system and independently from any effects upon furnace equipment. Accordingly, where the flue gas contains corrosive gases such as sulphur dioxide and/or corrosive hygroscopic materials such as salts, the concentration of corrosive liquids formed by these materials with water may be diluted by increasing the amount of water directed through the probe 12.

A preferred form of the probe 12 illustrated in FIG. 2 comprises a pair of concentrically aligned tubes 18 and 19 having an annular space 20 therebetween through which the gas sample and the washing fluid are passed from annular inlet 11 to an outlet 21 and thence to sampling line 14. The tube 19 carries water to a nozzle 22 located beyond the inlet 11 and mounted onto the end of the tube 19. The water is reversed within the nozzle 22 and flows from a jet or jets 23 into the inlet 11 and through the tube 18. These jets 23 are provided by a plurality of circularly disposed openings facing into the annular inlet 11. The introduction of all the washing water into inlet 11 is assured by arranging the jets 23 in a configuration so that the resulting spray of wash water at the inlet 11 in the form of a plurality of streams has a cross-sectional area less than the cross-sectional area of the inlet. There is thus avoided the introduction of wash water into the flue duct and the consequent interference with the proper operation of furnace equipment such as preheaters and filters.

The pressure at which the washing water is forced from the openings will vary with each application. It may be controlled by valve 24 (FIG. 1) and measured by gage 25 located in wash-water feed line 26. One requirement is that such pressure should be adequate to form a stream which will pass through the space from the openings 23 into the inlet 11. Another factor to be considered is the rate at which the gas current flows through the flue 10. The velocity of the water flowing from the nozzle 22 should be sufficient so as not to be excessively deflected by gas currents flowing across the path of the wash water. In one installation of the present invention the wash water was fed from the nozzle at a pressure of 10 pounds per square inch gauge and all the water entered the probe 12 despite a gas current flow through the flue duct at 50 feet per second. For most practical applications of the present invention the water supplied for washing purposes should be available from a system capable of producing pressure variations of from 5 to 25 pounds per square inch, in order to provide for adjustment in the water stream velocity and for variation in the quantity of water introduced into the probe.

The openings or orifices 23 formed in the nozzle 22 are preferably of a small cross-sectional area, usually of the order of one thirty-second inch in diameter. Accordingly, it is desirable to provide a source of filtered water to provide a washing fluid from which the larger solid particles have been removed.

In order to assure the cleaning of all the internal surfaces of the probe 12 by the washing water, the washing water is moved in a swirling path soon after it enters the probe 12. The swirling action may in one embodiment be provided by a helical coil 27 mounted within the concentric space 20 and substantially filling the space to impart to the water a helical motion. The swirling motion imparted to the water by the helical coil 27 breaks the washing water into small droplets which are caused to move to and along the inside surface of the tube 18 to maintain the surface free from accumulation of solid particles.

The helical coil 27 may extend a substantial length of the probe or as shown may comprise a coil of a few turns extending only a short distance from the inlet 11.

The inner tube 19 is maintained in concentric relation with tube 18 by the helix 27 mounted at one end of the tube 19 and by a water-tight plug 28 mounted at an opposite end of the inner tube. The plug 28 is shown arranged with a threaded end 28a adapted for connection to a feed line 26 connected to a suitable source of wash water. The plug 28 also provides a barrier dividing the passageway 20 from the center portion of the tube 19 at the exhaust 21.

Because all the wash water is passed from the nozzle 22 into the inlet 11 and through the probe 12 in avoidance of water flow into the duct or process, the amount of water introduced into the probe may be varied to suit other considerations of the specific installation. For example, where the corrosive content of the flue gas is high it will be desirable to use more water than would be used where the corrosive content of the flue gas is lower; the increased amount of water being employed to dilute the liquids formed by the combination of some of the corrosive gases and hygroscopic solid particles with the wash water. In a specific installation where the inner tube 19 had an outside diameter of one-quarter inch and the tube 18 had an inside diameter of one-half inch water was introduced into the probe at the rate of one quart per minute. Under the specific conditions of corrosive gas content this amount of water was adequate to dilute any acids formed within the probe and, in addition, was found to have a negligible effect upon the oxygen concentration of the gaseous sample.

The probe 12 may be mounted directly to the wall of duct 10 or, as shown, may be mounted by way of structure including sleeve 29 threaded to a bushing 10a welded on inner wall structure 10b. The wall structure 10b may be covered as at 10c with suitable heat insulating material. A cap 30 mounted at an opposite end of the sleeve 29 receives the probe 12 which is secured thereto by sleeve 31. The sleeve 31 is fastened to cap 30 by way of circumferential weld 31a.

The probe 12 may extend into the flue at any angle. However, it is preferred that the probe assembly 12 be held at an angle, for example, of 5° with respect to horizontal with the gas inlet 11 higher than the gas outlet 21 with the probe so disposed that all the wash water will flow through the probe to the outside of the flue duct and run out through the outlet 21 even in the absence of aspiration. Where the pressure within the duct 10 is subatmospheric there may be produced, in absence of aspiration, sufficient low pressure to cause reverse flow through the sampling tube resulting in wash water being drawn into the flue. For this reason it may be desirable to include a pressure responsive switch (not shown) at or beyond the discharge of the aspirator 13 (Fig. 1) in order to provide a signal to indicate when the gas flow through the sampling probe assembly 12 has stopped and to indicate that there is a danger of water being drawn into the flue duct. If desired, suitable automatic wash water shutoff valve may be added for operation in conjunction with the pressure responsive switch.

While the sampling probe of the present invention is illustrated as being employed with a specific gas cleaning and analyzing system now to be described, it will be understood that the probe is effective with other types of gas cleaning and analyzing systems.

In the cleaning and separating system of FIG. 1 the sample of gas is drawn into the system by operation of the steam aspirator 13, conditioned for separation of the solid particles from the gas by the aspirator and by the condenser 15 and the solid particles and water are separated from the gas within the separator 16; the clean gas then being directed to the analyzer 17. This sampling and cleaning arrangement is effective for removing solid particles ranging in size from less than one micron and larger and is capable of continuous operation for extended periods of time without the necessity of major maintenance requiring the shut-down of the system.

In the preferred arrangement the aspirator 13 is comprised of a steam nozzle 32 which passes a high velocity jet of steam past the exhaust connection of the sampling probe 12 to produce at the inlet of the sampling probe a low pressure for aspiration of sample gases through the probe and into the steam jet. From the steam nozzle 32 to the analyzer 17 the system is under positive pressure due to the steam flow from the nozzle 32 and thus there is avoided the introduction into the system of contaminating atmosphere gases.

By reason of the increased amount of wash fluid introduced into the sampling lines by probe 12 the jet nozzle 32 and chamber 13a are maintained free from accumulation of solids carried by the gas sample. There is thus obviated frequent shut-downs of the sampling system for purpose of cleaning the aspirator 13.

The steam aspirator 13 also performs a first step in the conditioning of the gaseous sample for separation of solid particles and corrosive gases therefrom. The sample gases entering the aspirator 13 are intimately mixed with the steam from the nozzle 32. During the course of mixing the steam surrounds the individual solid and liquid particles contained in the gas sample. The mixture of steam, gas and solid or liquid particles passes out of the chamber 13a by way of a diffuser 33 including a venturi section 34 into the condenser 15 where the mixture is reduced in temperature and the steam condensed. The steam condenses about the solid or liquid particles; the particles serving as nuclei about which the condensed steam forms in droplets. The apparent weight of the dust particles is increased and thus the dust particles are conditioned for separation from the gas within the separator 16.

The condenser 15 is of the type in which water is fed into the condenser chamber from a nozzle 35 connected as by way of pipe 36 to a source of water which may be the same source used for washing purposes within the probe 12. While the water may be sprayed into the condenser, in the illustrated embodiment it is fed into the condenser in a solid stream. The stream of water from the nozzle 35 is fed into the condenser at sufficiently high pressure, for example 15 p.s.i., which may be indicated by gage 38, so that upon striking an oppositely disposed wall of the condenser the stream of water breaks up into droplets thoroughly intermixing with and rapidly cooling the gaseous mixture. Condensation of the steam is essentially complete by the time the mixture enters the separator 16.

Contrary to expectation the water introduced into the condenser 15, even though it be of the type referred to as normal, that is water which has not been deaerated, does not materially affect the accuracy of the oxygen measurement made of the gaseous sample. While the accuracy of the oxygen measurement is affected by the introduction of the air from the condenser water and while the amount of air released from the condenser water will increase with increase of water temperature, the error introduced in the actual measurement of oxygen content is kept at a low value by making small the ratio of condenser water flow to sample gas flow. In this manner the amount of air released forms a very small percentage of the total volume of gas to be analyzed. For example, in one system now in use 30 cubic feet per hour of sample gas was drawn through the sampling system while condenser water was fed into the system at the rate of 60 gallons per hour. In this system the error introduced amounted to less than one-tenth of a percent of oxygen by volume. With the percentage of error known, the analyzer 17 may be preset to take into account this error and thus be adjusted to render an accurate reading of oxygen concentration. Because the error introduced by the illustrated system is of such a low order of magnitude it has been found that overall variations in error over long periods of operation are also of a low order and for this reason the analyzer, once calibrated, need not again be adjusted unless the above ratio be altered.

The accuracy of the measurement of oxygen concentration is also affected by the degree of absorption of carbon dioxide in the condenser water. Inasmuch as gas analyzers measure concentration by volume, a change in the volume as by absorption of carbon dioxide will materially affect the percentage concentration of the other components. Accordingly, it is desirable to minimize absorption of carbon dioxide by the condenser water. Absorption of carbon dioxide will decrease with increase of water temperature. For example, at 20° C., 0.17 gram of carbon dioxide can be dissolved in 100 cc. of water. As the temperature of the water approaches its boiling point the carbon dioxide absorption becomes essentially zero. Therefore, the amount of water introduced into the condenser 15 may be adjusted so that the water issuing from the condenser will be at a temperature sufficiently high, as indicated by a suitable temperature-responsive device 51, to minimize carbon dioxide absorption. For example, in one system the temperature of the water issuing from the condenser 15 was maintained at 140° F. The error in the oxygen measurement amounted to less than one-tenth of one percent.

Where the gaseous component to be analyzed is carbon dioxide it may be desirable to maintain the water issuing from the condenser at a temperature higher than 140° F. Although oxygen released from the condenser water increases with water temperature the percentage change of oxygen content does not materially affect the accuracy of the carbon dioxide measurement.

The amount of water introduced into the condenser 15 will also be determined by the acid concentration of the mixture fed to the condenser. While the water-washed probe of the present invention adequately dilutes acids formed by absorption of corrosive gases, such as sulphur-dioxide, some of the corrosive gases remain in a free non-absorbed state. However, when the gas sample is mixed with the steam within the steam aspirator 13 some of the remaining corrosive gases may go into solution with the wash water from the probe 12. Under certain circumstances the concentration of the acids or corrosive liquids thus formed may be increased to a value high enough to cause corrosion within the gas cleaning equipment. Since the concentration of corrosive liquids increases with time of contact between the gases and the water, the concentration may be maintained at an effectively non-corrosive level by arranging the condenser physically as close as possible to the steam aspirator. The remainder of the corrosive gases are absorbed within the condenser 15 by condensation of the steam. The additional corrosive liquids thus formed are diluted by the condenser water. Under most conditions the water required for condensation purposes will be adequate to completely dilute the corrosive liquids.

The mixture from the condenser 15 comprised of the condensed steam, conditioned solid or liquid particles, diluted acids and gases is then separated by causing the mixture to flow rapidly in a vortical path. The separation is carried out within the centrifugal separator 16 having a tangential inlet 39 connected to the condenser 15. The mixture is introduced into the centrifugal separator at a high velocity imparted to the mixture by the flow of steam out of the steam nozzle 32. The mixture is rotated due to its own velocity at a high speed which develops centrifugal force for movement of the water particles and entrained dust particles outwardly and downwardly along the walls of the separator with coincident movement of the now clean gaseous sample inwardly and upwardly. The clean, solid-free gas sample is withdrawn from the upper portion of the separating zone within the separator 16 and conducted at high velocity to the analyzer 17 as by way of pipe or conduit 42a. The velocity and pressure of gas introduced to the analyzer by way of line 42a may be varied by adjusting valve 40 controlling the flow of steam from the nozzle 32. The pressure is indicated by gage 41. Gas sample velocities of 50 feet per second or higher are easily attainable.

The volume of the separating portion of the centrifugal separator 16 is preferably made small, while still retaining efficient gas cleaning characteristics, in order to reduce the time for a specific sample of gas to be moved from the inlet of the separator to the gas outlet thereof. This factor is of partciular importance where the analyzer 17 is to be part of a control apparatus governing the operation of the furnace. In such instances the time lag, that is the time it takes for a gas sample to be drawn into the probe and finally introduced to the analyzer, should be as small as possible.

The centrifugal separator 16 is provided with a pair of outlets, one of which, the clean-gas outlet 42, is at all times open to the analyzer, the other one of which, the refuse outlet 43, is operated by a float controlled valve 44 to assure a predetermined separating space for the mixture, and to prevent loss of sample gases to the atmosphere.

The float control valve 44 within the centrifugal separator 16 is of the balanced type and accordingly is moved to an opened or closed position independently of the static pressures within the separator. The valve 44 includes a float member 45 which is responsive to the height of the water and waste mixture within the separator to open or close valves 46 and 47 mounted to a stem 48 attached to the underside of the float member 45. The float control valve 44 maintains the height of the water and waste mixture at a substantially constant level. For example, when the volume of the water and waste mixture rises above a predetermined point the float valve 44 rises to lift the valve members 46 and 47 from their respective seats 49 and 50 thus permitting a quantity of the mixture to be exhausted by way of outlet 43. As the volume of the mixture is decreased the valve members 46 and 47 are again seated.

As aforesaid, the operation of the float control valve 44 is independent of the static pressures within the separator by reason of the pressures acting upon valve member 46 in a downward direction being counteracted by the pressures being brought upon the valve member 47 in an upward direction. While the illustrated float control valve 44 is of a preferred construction it will be understood that other float control valves may be substituted therefor and that other constructions of centrifugal separators and other forms of separators may also be employed for the separation of the sample gases from the water particles and solid matter. It is desirable, however, that the separator be of the centrifugal type in order that the time lag of the system be reduced to a value making practical the application of the gas analyzing system to automatic control of a furnace or process.

In one installation of the present invention the anlyzer was located 180 feet from the probe. The time interval for a gas sample to reach the analyzer was between 8 and 10 seconds. Because the gas issuing from the separator 16 was free of solids and corrosive materials the line 42a was of copper tubing having an internal diameter of three-sixteenths inch.

With the described system including the improved water-washed probe 12 of the present invention the system time lag has been reduced to a significant degree. In addition, corrosion has been reduced and furnace equipment has been protected from the effects of the washing water so that the sampling system is continuously operable over long periods of time without necessitating shut-downs for maintenance and/or repair. Accordingly, a clean gas sample is at all times continuously and rapidly fed to the analyzer. Therefore, any suitable gas analyzer may be connected for automatic control of furnace or process operation.

What is claimed is:

1. A water-washed probe for obtaining gaseous samples from a dust-ladened atmosphere comprising a first tube extending into the atmosphere and having an inlet and an outlet, said outlet having means for connection to an aspirator for drawing gaseous samples into said inlet and through said first tube, a nozzle having a plurality of circularly disposed openings, a second tube concentrically mounted within and extending beyond the inlet of said first tube for carrying washing water to said nozzle, said nozzle being mounted on said second tube and outside said first tube and having its openings directed toward said inlet thereof, said openings within said nozzle providing a spray of washing water having an area less than the area of said inlet for assuring that all the wash water enters said first tube, and a helix mounted about said second tube in the vicinity of said inlet for supporting one end of said second tube in concentric relation with said first tube and for imparting to the wash water a swirling motion to bring the water into washing contact with wall structure of the first and second tubes as the water and gas sample are carried through said first tube.

2. A gas-sampling apparatus for producing a solid-free and non-corrosive stream of gas from a dust-ladened atmosphere comprising a gas sampling line having an inlet disposed within the dust-ladened atmosphere, means for maintaining open the inlet to the sampling line comprising a nozzle disposed outside said sampling line with the openings of said nozzle facing toward said inlet to direct wash water toward and into said inlet to prevent accumulation in the region of said inlet of dust and other solid particles, the flow of water from the nozzle in the region of said inlet encompassing an area less than that of said inlet to insure that all the water from the nozzle enters said inlet, said line at a region removed from said atmosphere having a steam nozzle therein for developing at the inlet of said sampling line a low pressure for flow into the line of a gaseous stream from the dust-ladened atmosphere, water-introducing means disposed downstream from said steam nozzle for injecting into the mixture of steam and the dust-ladened stream and in thorough mixture therewith water in amount for condensation of the steam, said dust particles within said mixture serving as nuclei wettable by the condensing steam to form water droplets thereby increasing the apparent mass of the dust particles, a separating chamber, an inlet to said separating chamber for directing the mixture of condensed steam and gas tangentially into said chamber for the development of centrifugal force due to the resultant vortical flow therein of the mixture for movement of the dust particles surrounded by droplets of water to the walls of the chamber, said chamber having a space above the point of inlet for a gas separating zone, and a gas outlet connected to said gas separating zone for outward flow of a solid-free gas sample.

3. A device for obtaining samples of gases from a dust-ladened atmosphere, comprising a tubular member having an inlet adapted to be positioned within the atmosphere and having means for connection to a suction device for drawing gases into said inlet and through said tubular member, liquid carrying means disposed within said tubular member, a helical structure extending along at least a portion of the length of said tubular member for maintaining said liquid carrying means in concentrically disposed relation thereto, and a nozzle disposed in flow connection with said liquid carrying means and disposed outside of said tubular member and in spaced relation from said inlet for directing toward said inlet a stream of liquid of lesser cross-secton than the cross-section of said inlet for entry of all of the liquid into said tubular member in the direction of flow of the gases into said inlet and through said tubular member.

4. A water-washed probe for obtaining a sample stream of gases from a dust-ladened atmosphere, as occurs in a furnace, comprising a sampling tube having an inlet and an outlet, means supporting said tube with one end-portion thereof protruding into said dust-ladened atmosphere, said one end-portion of said tube having an opening forming said inlet for flow of the gases into said tube, suction means connected to said outlet for producing a continuous flow of a stream of said gases through said inlet opening and lengthwise of said tube, and means including a nozzle for directing in the direction of flow of gases lengthwise of said tube a stream of water under pressure from a position on the remote side of said inlet opening from said outlet, in cleaning relationship with said inlet opening, and within the boundaries of the flow path of said gases, to maintain clear said inlet opening against deposits of foreign material included in the stream of dust-ladened gases.

5. A water-washed probe for obtaining a sample stream of gases from a dust-ladened atmosphere, as occurs in a furnace, comprising a sampling tube having an inlet and an outlet, means including tubular structure supporting said tube with one end-portion thereof protruding into said dust-ladened atmosphere, said one end-portion of said tube having an opening forming said inlet for flow of the dust-ladened gases into said sampling tube, suction means connected to said outlet for producing flow of a stream of said gases through said inlet opening and lengthwise of said tube, means including a water-supplying tube disposed within said tubular structure, and a nozzle carried by an end-portion of said water-supplying tube having water-directing means for directing streams of water under pressure lengthwise of said tube, said water-directing means of said nozzle having dimensions for limiting the cross-sectional areas of said streams of said water in the region of said inlet opening to less than the cross-sectional area of the flow passage for said gases within said sampling tube thereby to maintain open said inlet opening and to maintain the internal surfaces of the sample tube free of the foreign material carried by the dust-ladened atmosphere.

6. A water-washed probe for obtaining a sample stream of gases from a dust-ladened atmosphere, as occurs in a furnace, comprising a sampling tube having an inlet at one end thereof and an outlet at another portion of said tube, means supporting said tube with said inlet disposed within said dust-ladened atmosphere and said outlet disposed in a dust-free atmosphere, suction means connected to said outlet for producing a continuous flow of said dust-ladened atmosphere through said inlet to form said sample stream of gases, and means including a water-supply pipe extending coaxially of said sampling tube and having an outside diameter materially less than the inside diameter of said sampling tube to provide an annular flow space between said sampling tube and said water-supply pipe, said water-supply pipe extending beyond the inlet end of said sampling tube, said water pipe having in spaced relation with said inlet end of said sampling tube a nozzle, said nozzle having water-directing means facing directly into said annular space for directing water under pressure into said annular space to maintain said annular opening free of deposits of foreign material included in said dust-ladened atmosphere and to provide wash water throughout said annular space to maintain the internal surfaces thereof free of corrosion and of accumulation of deposits of said foreign material.

References Cited in the file of this patent

UNITED STATES PATENTS

| | | |
|---|---|---|
| 714,793 | Gathmann | Dec. 2, 1902 |
| 2,179,919 | Carr | Nov. 14, 1939 |
| 2,356,845 | Hines | Aug. 29, 1944 |
| 2,550,933 | McEvoy | May 1, 1951 |
| 2,579,282 | Vicard | Dec. 18, 1951 |
| 2,682,277 | Marshall et al. | June 29, 1954 |
| 2,685,205 | Barnard | Aug. 3, 1954 |
| 2,726,767 | Rakowsky | Dec. 13, 1955 |
| 2,740,291 | Brown | Apr. 3, 1956 |

FOREIGN PATENTS

| | | |
|---|---|---|
| 651,340 | France | Oct. 9, 1928 |
| H173461X/421 | Germany | Nov. 24, 1955 |